United States Patent
Baldeosingh et al.

(10) Patent No.: US 10,436,264 B2
(45) Date of Patent: Oct. 8, 2019

(54) SPRING APPLIED, HYDRAULICALLY RELEASED BRAKE WITH MANUAL OVERRIDE

(71) Applicant: Ausco Products, Inc., Benton Harbor, MI (US)

(72) Inventors: Howard H. Baldeosingh, Stevensville, MI (US); Brian P. Dennis, Kalamazoo, MI (US); Kenneth A. Dodd, Dowagiac, MI (US)

(73) Assignee: AUSCO PRODUCTS, INC., Benton Harbor, MI (US)

( * ) Notice: Subject to any disclaimer, the term of this patent is extended or adjusted under 35 U.S.C. 154(b) by 0 days.

(21) Appl. No.: 15/603,763

(22) Filed: May 24, 2017

(65) Prior Publication Data
US 2018/0340583 A1   Nov. 29, 2018

(51) Int. Cl.
| | | |
|---|---|---|
| *F16D 55/24* | (2006.01) | |
| *F16D 55/38* | (2006.01) | |
| *F16D 65/18* | (2006.01) | |
| *F16D 65/12* | (2006.01) | |
| *F16D 55/36* | (2006.01) | |
| F16D 121/06 | (2012.01) | |
| F16D 121/14 | (2012.01) | |
| F16D 127/04 | (2012.01) | |

(52) U.S. Cl.
CPC ............ *F16D 55/38* (2013.01); *F16D 55/36* (2013.01); *F16D 65/127* (2013.01); *F16D 65/186* (2013.01); *F16D 2121/06* (2013.01); *F16D 2121/14* (2013.01); *F16D 2127/04* (2013.01)

(58) Field of Classification Search
CPC ......... F16D 2121/02; F16D 2065/1364; F16D 2055/0091; F16D 55/24; F16D 55/36; F16D 55/40; F16D 55/38; F16D 2121/12; F16D 2121/06; F16D 2125/06; F16D 2127/04
See application file for complete search history.

(56) References Cited

U.S. PATENT DOCUMENTS

| | | | | |
|---|---|---|---|---|
| 2,948,359 A | * | 8/1960 | Barrett .................... | B60T 1/067 188/106 R |
| 3,132,724 A | * | 5/1964 | Ansteth ................... | F16D 55/40 188/170 |

(Continued)

FOREIGN PATENT DOCUMENTS

| | | | | |
|---|---|---|---|---|
| DE | 4329542 A1 | * | 3/1994 | ............. F16D 55/38 |
| EP | 0869279 A1 | * | 10/1998 | ............ F03C 1/0447 |

(Continued)

OTHER PUBLICATIONS

European Search Report (Application No. 18164433.7) (6 pages—dated Sep. 28, 2018.

*Primary Examiner* — Bradley T King
*Assistant Examiner* — Stephen M Bowes
(74) *Attorney, Agent, or Firm* — Renner Kenner Greive Bobak Taylor & Weber

(57) ABSTRACT

A brake (10,100) includes a piston (14,112) housing one or more springs (16,114) therein. The one or more springs (16,114) are adapted to urge an extension (30,140) of the piston (14,112) into contact with a disc stack (22,122) in a default position of the brake (10,100). Piston body (18,112) may be latitudinally offset from disc stack (22,122) by a distance (39,141). The brake (10,100) includes a manual release feature (70/72, 176).

8 Claims, 17 Drawing Sheets

(56) References Cited

U.S. PATENT DOCUMENTS

| | | | | |
|---|---|---|---|---|
| 3,791,492 A | * | 2/1974 | Neilsen | F16D 59/02 |
| | | | | 188/106 P |
| 3,893,549 A | * | 7/1975 | Bennett | B60T 17/22 |
| | | | | 188/170 |
| 4,024,936 A | | 5/1977 | Crabb | |
| 4,245,724 A | * | 1/1981 | Beck | F16D 55/40 |
| | | | | 188/170 |
| 4,263,991 A | * | 4/1981 | Morgan | B60T 13/16 |
| | | | | 188/170 |
| 4,540,073 A | | 9/1985 | Rogier | |
| 6,089,357 A | | 7/2000 | Jackson et al. | |
| 7,258,208 B1 | | 8/2007 | Dennis et al. | |
| 2007/0095619 A1 | | 5/2007 | Mayberry et al. | |
| 2009/0026024 A1 | * | 1/2009 | Baldeosingh | F16D 59/02 |
| | | | | 188/72.3 |

FOREIGN PATENT DOCUMENTS

| | | | | |
|---|---|---|---|---|
| FR | 2045091 | | 2/1971 | |
| GB | 1421039 A | * | 1/1976 | F16D 55/28 |

\* cited by examiner

SPRING APPLIED, HYDRAULICALLY RELEASED BRAKE WITH MANUAL OVERRIDE

TECHNICAL FIELD

This invention relates to a spring applied, hydraulically released brake. More particularly, this invention relates to a spring applied, hydraulically released brake that includes a manual override.

BACKGROUND

Construction vehicles, such as backhoe vehicles, are known to use parking brakes. One such configuration is a mechanically actuated brake where the operator uses a lever acting on a cable or pull rod to engage and disengage the parking brake. Engagement occurs when the operator pulls a lever located in the cab of the vehicle. The lever acts on a cable or pull rod. The cable or pull rod engages the parking brake. To disengage the park brake, the lever in the cab is returned to its original position. This type of brake actuation is strictly mechanical. But in certain prior art configurations, a vehicle does not have space available for the lever. This design also requires that the operator remember to pull the lever to engage the parking brake when parking the vehicle. Should the operator forget, the vehicle could roll away, causing a hazardous condition.

Similarly, another prior art configuration is the use of a spring-applied, hydraulically released (SAHR) canister attached to the brake. For this configuration, the parking brake is mounted to the transmission and a SAHR canister is attached to the parking brake. The transmission hydraulic circuit is connected to the canister. Springs in the canister push on a piston which is attached to a pull rod or cable on the brake. If the vehicle is turned off or hydraulic pressure to the canister is interrupted for any reason, the springs push on the piston, the piston pulls the rod or cable, and the rod or cable engages the brake. To release the park brake, the low pressure transmission hydraulic circuit acts on the piston, and the piston compresses the springs that are engaging the brake and thus releases the brake. In order for the park brake to engage once again, hydraulic pressure must fall to zero. A problem with this configuration is that the hydraulic pressure available to certain brakes is very low. In order to overcome the spring force, the piston would need to be very large. Also, the canister might be too large to fit in the vehicle due to neighboring components, hoses, and hydraulic lines. Further, brakes utilizing a canister, or a lever, have increased complexity, which results in increased costs and potential for leaking.

Another prior art configuration is to use a conventional SAHR parking brake. This configuration uses one or more springs to clamp friction discs together to engage the parking brake. The parking brake will release when hydraulic pressure is applied to an annular piston that compresses the springs. When the springs are compressed, the clamp on the friction discs is relieved. The parking brake engages again when hydraulic pressure falls to zero. The problem with this configuration is that the cylindrical piston area needed to overcome the springs is too large for certain brakes. In these brakes, the necessary design size for the brake would have to be too large to fit in certain vehicles due to neighboring components, hoses, and hydraulic lines.

These prior art configurations have an inconvenient or hazardous method of manually disengaging the brake in the event of a hydraulic system failure. In the event the vehicle should require service, and the hydraulic system is not available to generate pressure, there remains a need to safely manually release the brake in the event the vehicle would need to be towed. There also remains a need for a brake that offers one or more improvements over the prior art, such as a more compact design, the inclusion of a manual release capability, and the ability to utilize a low pressure hydraulic circuit.

DISCLOSURE OF THE INVENTION

It is thus an object of one aspect of the present invention to provide a spring applied, hydraulically released brake that is able to utilize a low-pressure hydraulic circuit for releasing a parking brake.

It is an object of a further aspect of the present invention to provide a brake, as above, that includes the ability to manually release the parking brake.

It is an object of another aspect of the present invention to provide a brake, as above, having a compact, economical design.

These and other objects of the present invention, as well as the advantages thereof over existing prior art forms, which will become apparent from the description to follow, are accomplished by the improvements hereinafter described and claimed.

In general, a brake made in accordance with the present invention includes a piston having an axial center and a disc stack having an axial center offset from the axial center of the piston. One or more springs are adapted to urge the piston into contact with the disc stack to establish a default position of the brake.

In accordance with another aspect of the invention, a brake includes a piston having one or more springs that are adapted to urge the piston into contact with a disc stack by use of cylindrical posts to establish a default position of the brake.

A method of manually releasing the brake is also disclosed including the steps of removing a sealing plug, inserting a threaded article into a piston body to thereby urge the piston against springs to disengage a disc stack.

The threaded bore can receive either a sealing plug or a threaded article. When the sealing plug is positioned in the bore, the operator position of the brake is established, and alternatively, when positioning the threaded article in the bore, the piston is urged out of contact with the disc stack.

A preferred exemplary parking brake according to the concepts of the present invention is shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 1:
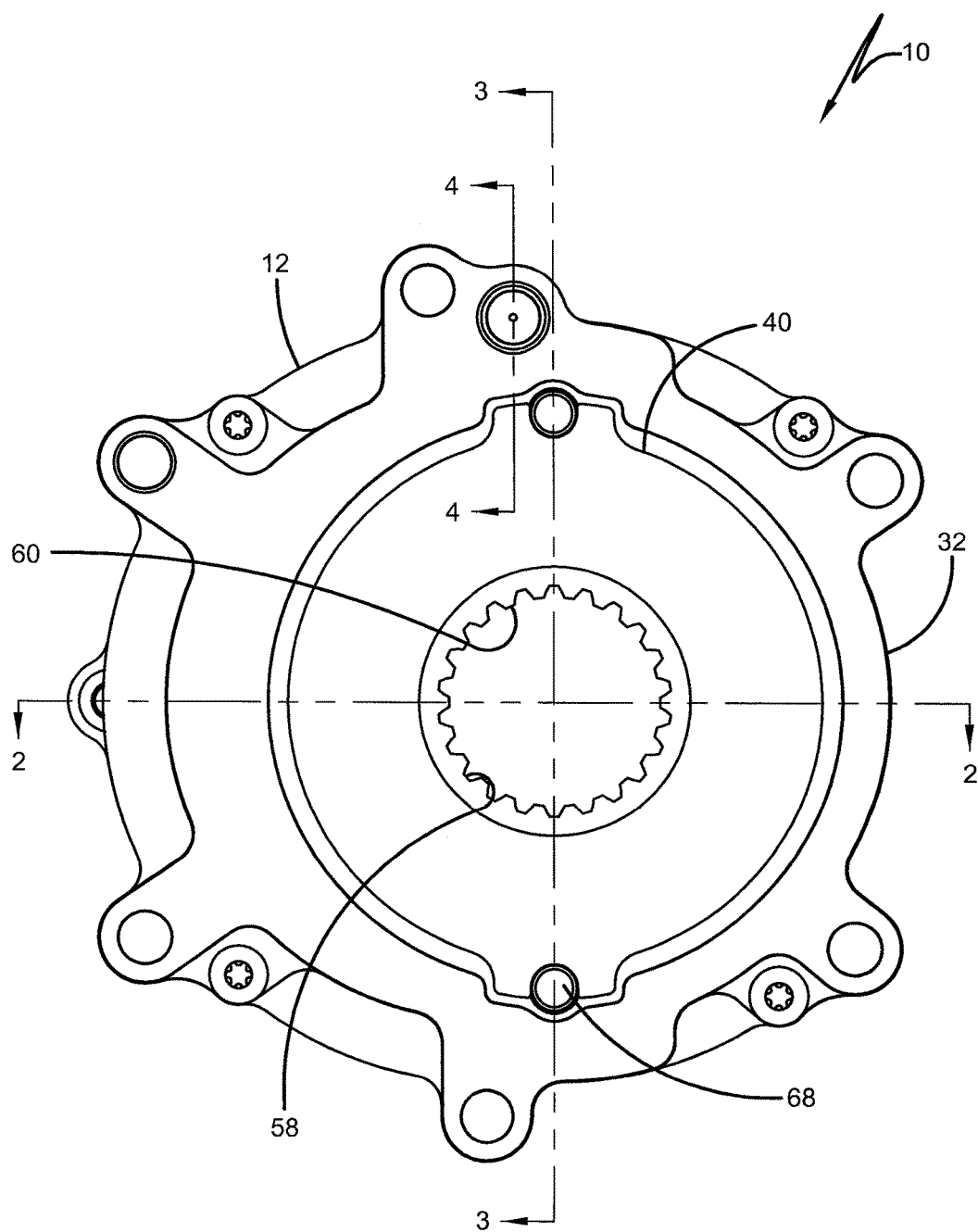
FIG. 1 is a front elevational view of a brake according to a first embodiment of the present invention.

A brake according to one or more embodiments of the present invention is generally indicated by the numeral 10, as shown in FIG. 1. Brake 10 includes a power plate 12, which carries and protects components of brake 10 and locates it in operative relation to a conventional vehicle transmission (not shown), preferably to the transmission of a construction backhoe. Power plate 12, mounts brake 10 to a conventional vehicle transmission by way of one or more fasteners (not shown). Multiple mounting adapters (not shown) for mounting brake 10 to various machines and transmissions are, or will become, generally known to one skilled in the art.

Figure 2:
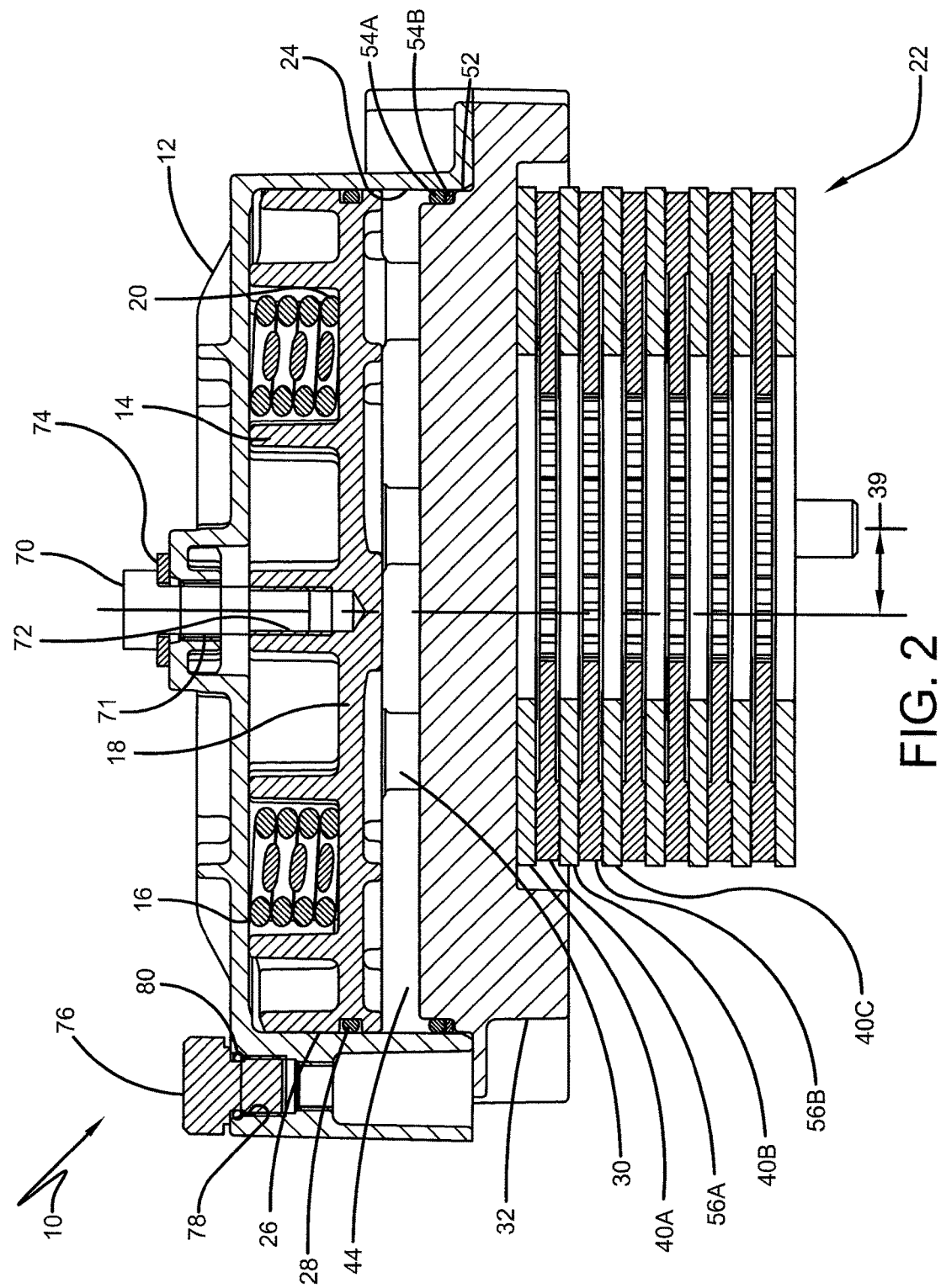
FIG. 2 is a sectional view taken substantially along line 2-2 of FIG. 1.

Power plate 12 houses a spring applied, hydraulically released (SAHR) assembly, which includes a piston 14 and a plurality of springs 16 capable of acting on piston 14, as shown in FIG. 2. Piston 14 includes a body portion 18 including one or more spring housings 20, which may also be described as spring pockets 20, to receive springs 16 therein. Spring pockets 20 may also be described as cutouts 20 formed in piston 14. A first end of each spring 16 engages piston 14 and a second end of each spring 16 engages power plate 12. Second ends of spring 16 may be supported by spring supports 17 formed in power plate 12. As will be described further herein, in a "default" position, springs 16 cause piston 14 to engage a disc stack, generally indicated by the numeral 22, to thereby enact a braking function.

Piston 14 is specifically housed in a bore 24 of power plate 12. Piston body portion 18 includes an outer cylindrical surface 26 that engages the chamber formed by housing bore 24. Outer cylindrical surface 26 may include a sealing ring, such as O-ring 28, to allow a small clearance between outer cylindrical surface 26 and bore 24 while still preventing fluid from leaking past this seal.

Figure 9:
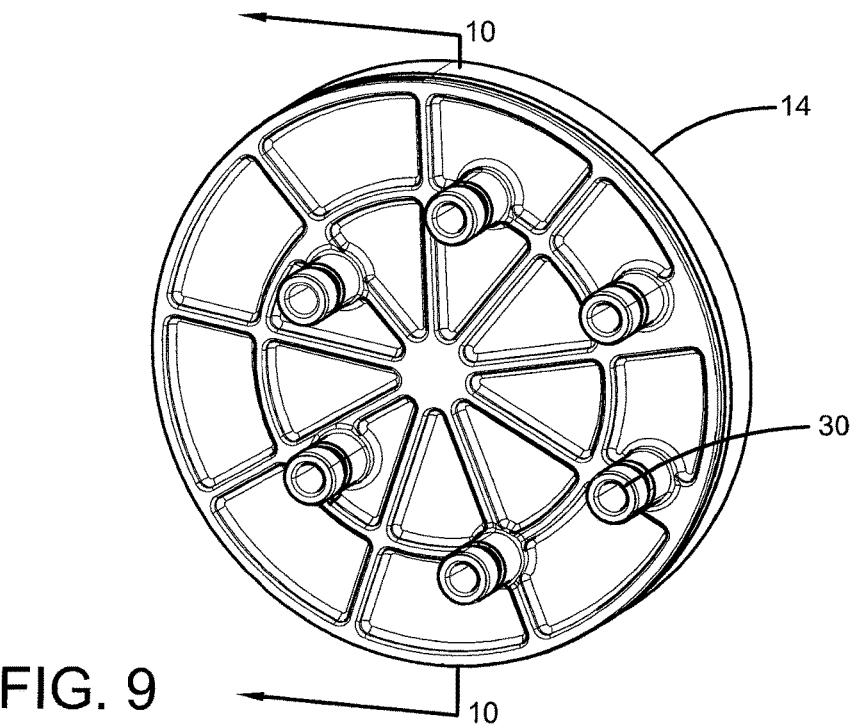
FIG. 9 is a front perspective view of a piston of the brake of FIG. 1.

Piston 14 includes one or more cylindrical posts 30 extending from body portion 18 through housing 32, which is coupled with power plate 12. Housing 32 may also be described as pressure cavity wall 32. As seen in FIG. 9, embodiments of the invention utilize a substantially circular array of cylindrical posts 30. That is, the plurality of cylindrical posts 30 generally forms a circular shape by their positioning. The center of this substantially circular array of cylindrical posts 30 is latitudinally offset from the axial center of piston 14. Although a circular array of six cylindrical posts 30 is shown in FIG. 9, any suitable arrangement and any suitable number of cylindrical posts 30 may be utilized. The use of cylindrical posts 30 instead of an annulus allows for multiple suitable configurations for the cylindrical posts 30 based on a desired design for brake 10.

Figure 10:
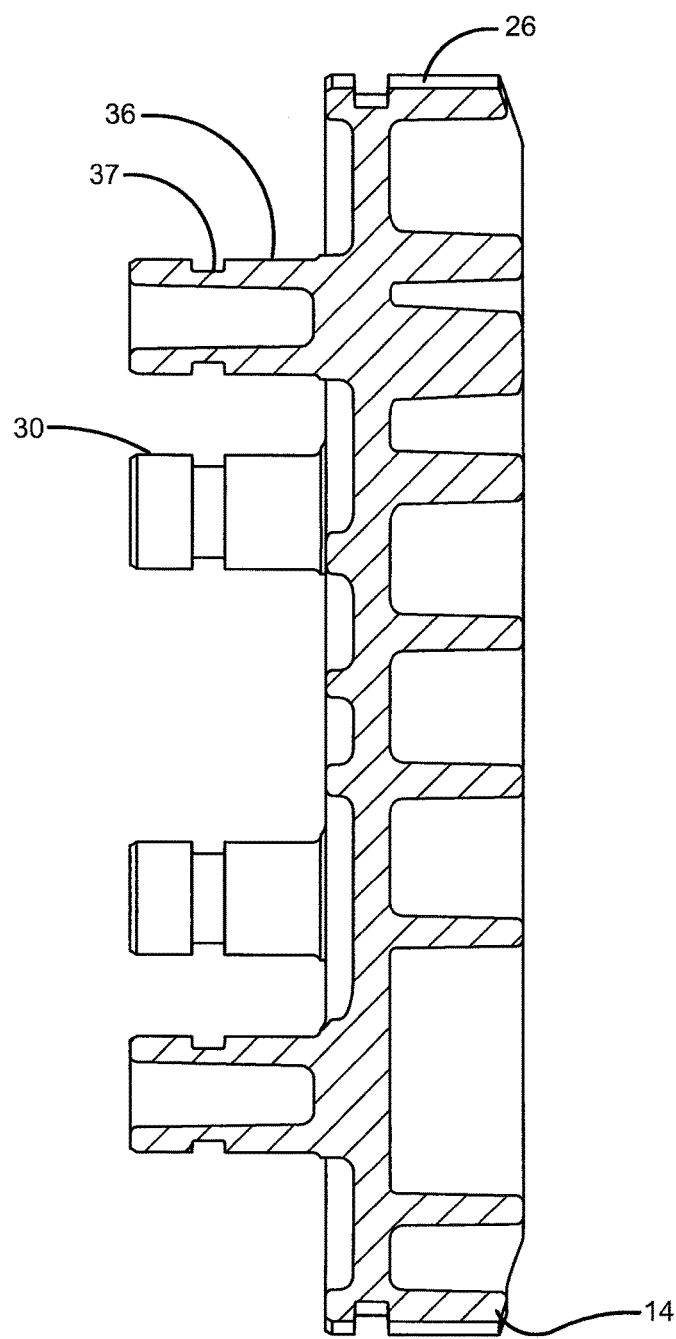
FIG. 10 is a sectional view taken substantially along line 10-10 of FIG. 9.
Figure 11:
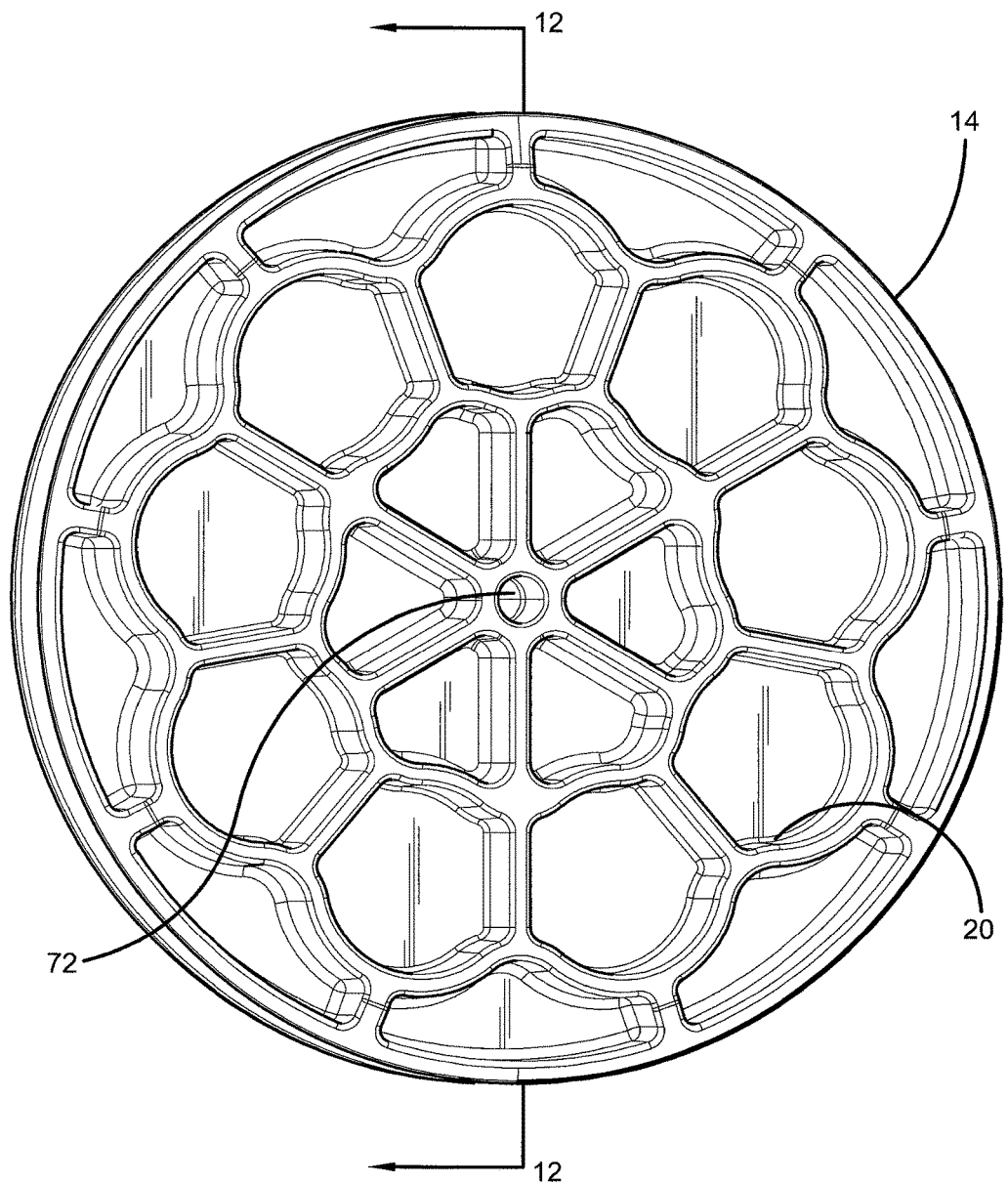
FIG. 11 is a rear perspective view of a piston of the brake of FIG. 1.
Figure 12:
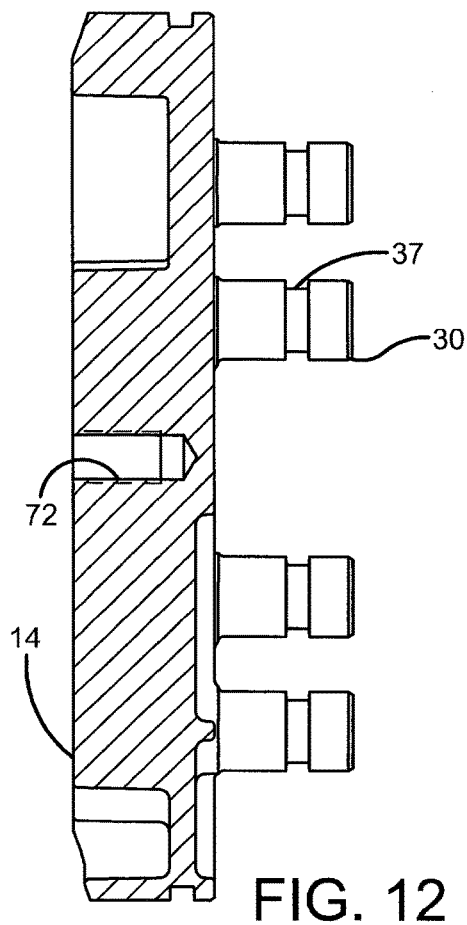
FIG. 12 is a sectional view taken substantially along line 12-12 of FIG. 11.

Each cylindrical post 30, which may also be referred to as a projection 30, extends toward and to disc stack 22 through a corresponding hole 34 in housing 32. One or more embodiments utilize a substantially circular array of holes 34 where the center of the substantially circular array of holes 34 is latitudinally offset from the axial center of piston 14. Each cylindrical post 30 includes an outer cylindrical surface 36 that engages housing 32 in the locations formed by holes 34. Outer cylindrical surface 36 may include a notch 37, as shown in FIG. 10, for receiving a sealing ring, such as a combination of O-ring 38A and backup ring 38B, to allow a small clearance between outer cylindrical surface 36 and hole 34 while at the same time preventing fluid from leaking past this seal.

As previously described, the "default" position of piston 14 allows springs 16 to cause cylindrical posts 30 to engage disc stack 22 to thereby enact a braking function. In this "default" position, a slight spacing exists between piston 14 and power plate 12. As seen in FIG. 2, in one or more embodiments the axial center of piston 14 is latitudinally spaced from the axial center of disc stack 22 as at spacing 39, which may also be described as offset 39. Latitudinal spacing 39 can be advantageous based on certain designs for brake 10 with respect to the vehicle transmission where brake 10 is to be mounted. Exemplary advantages include the ability of the brake to fit the available space and designing the brake to operate (i.e. create enough pressure to overcome springs and release the brake) with a predetermined low pressure hydraulic circuit. In one or more embodiments, latitudinal spacing 39 is a distance of from 0.25" or more to 1.5" or less. In one or more embodiments, latitudinal spacing 39 is a distance of from 0.5" to 0.6". In one or more embodiments, latitudinal spacing 39 is a distance of 0.562" or approximate thereto.

With respect to the engagement of disc stack 22, cylindrical posts 30 particularly engage a proximate, or inboard, stationary disc 40A of disc stack 22, thereby causing inboard stationary disc 40A to engage the next disc, and so on, to thereby engage disc stack 22. Thus, the spring force of springs 16 must be selectively overcome in order to move piston 14 to an unactuated position to disengage disc stack 22.

Figure 4:
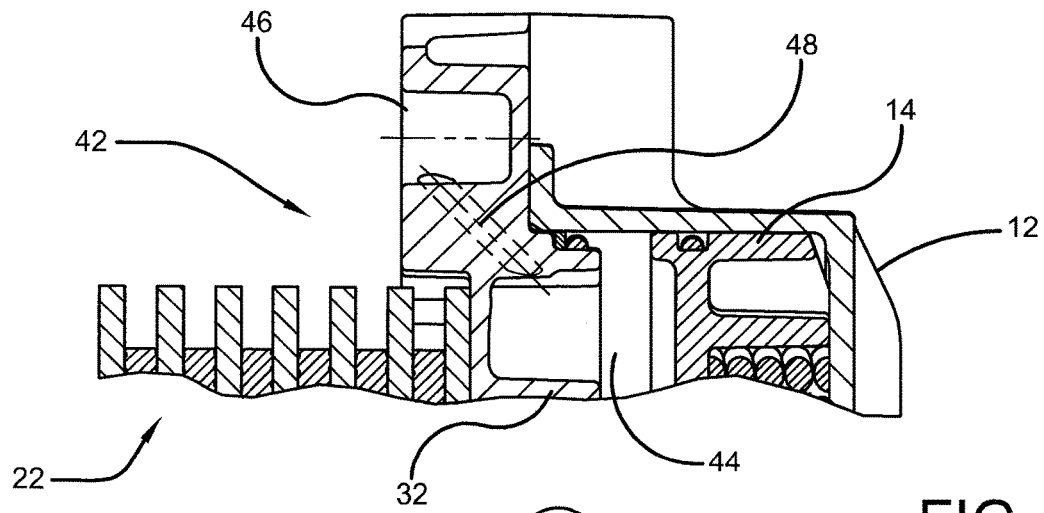
FIG. 4 is a sectional view of a hydraulic fluid port taken substantially along line 4-4 of FIG. 1.
Figure 5:
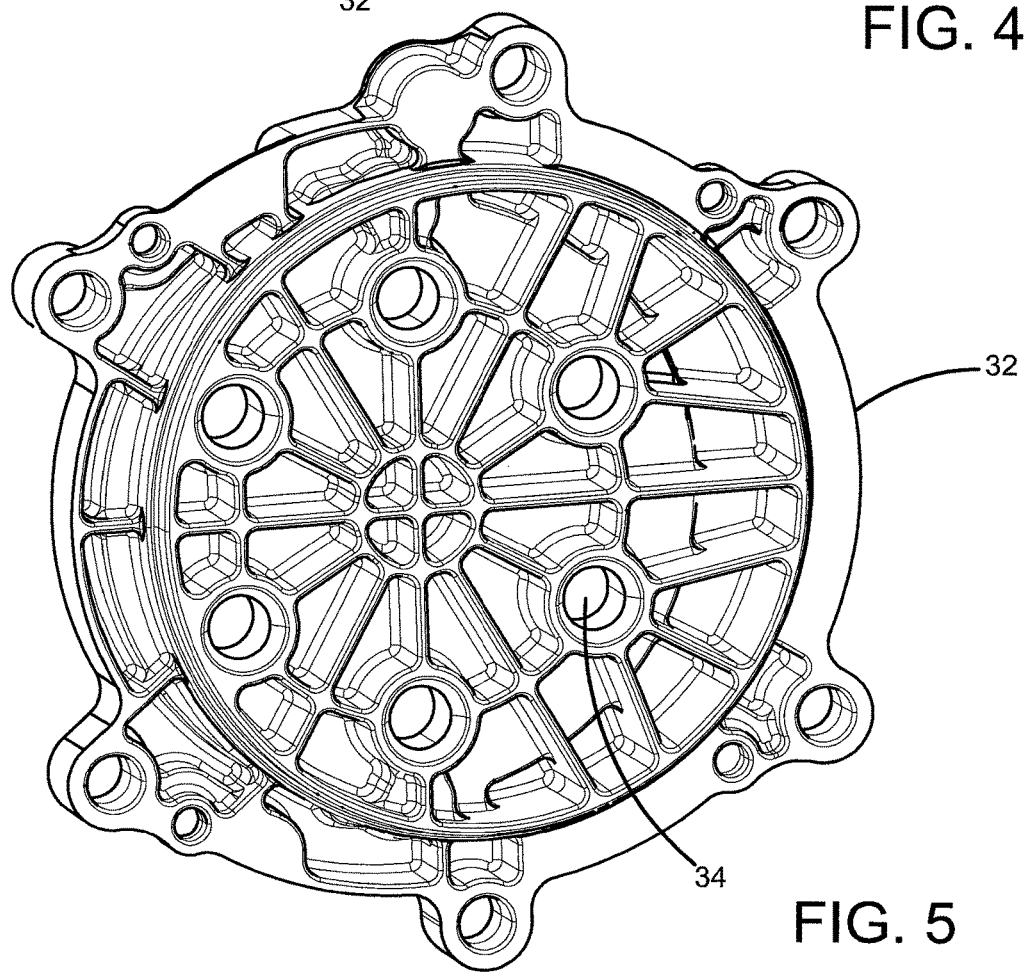
FIG. 5 is a rear perspective view of a brake housing of the brake of FIG. 1.

To accomplish this, a hydraulic fluid supply network, generally indicated by the numeral 42 in FIG. 4, provides pressurized fluid to a fluid chamber 44 by way of a fluid port 46 and a cross drilled hole 48 formed in housing 32. Generally, fluid chamber 44 includes the portion of brake 10 between housing 32 and piston 14. By way of fluid chamber 44, piston 14 can be said to be in fluid communication with a source of hydraulic fluid. Upon adding hydraulic fluid to fluid chamber 44, the hydraulic fluid fluidly engages piston 14 as to apply force against springs 16.

Figure 3:
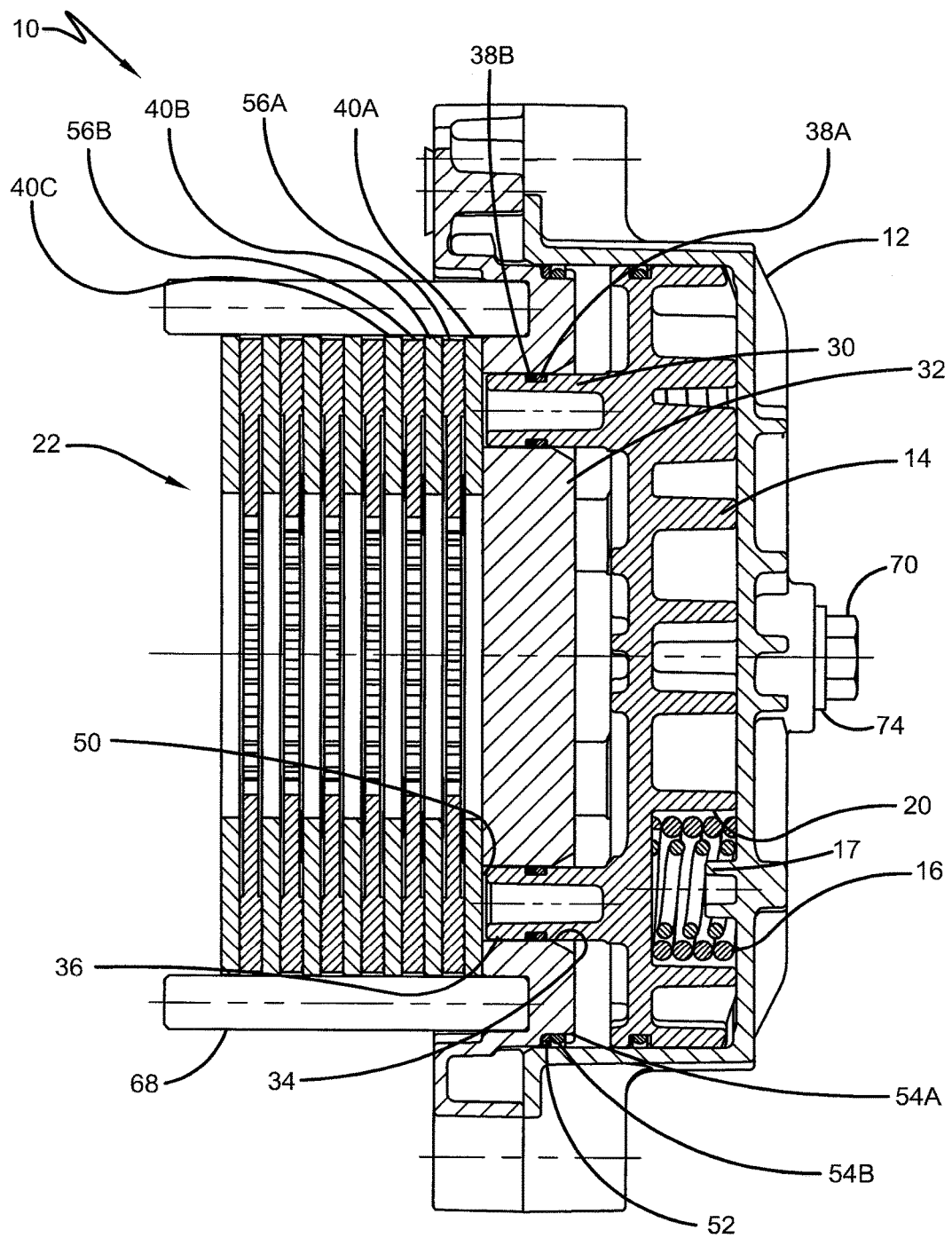
FIG. 3 is a sectional view taken substantially along line 3-3 of FIG. 1.

Once the pressure of the hydraulic fluid behind piston 14 is sufficient to overcome the spring force of springs 16, piston 14 travels against springs 16 until cylindrical posts 30 disengages inboard stationary disc 40A, thereby releasing disc stack 22. FIG. 3 shows piston 14 being disengaged from inboard stationary disc 40A, creating a spacing 50 between cylindrical posts 30 of piston 14 and inboard stationary disc 40A.

Advantageously, the structure of piston 14 allows the effective piston diameter of piston 14 to be larger than a piston without posts 30 and offset 39. Embodiments provide an effective piston diameter of piston 14 nearly as large as the area of power plate 12. This larger effective piston diameter allows for a generally lower hydraulic system pressure to generate enough force to overcome the spring force of springs 16 in order to disengage disc stack 22. In one or more embodiments, brake 10 may be utilized with a hydraulic system having an available pressure of from 100 psi to 150 psi. In one or more embodiments, brake 10 may be utilized with a hydraulic system having an available pressure of 128 psi or approximate thereto. In other embodiments, brake 10 may be utilized with a hydraulic system having an available maximum pressure of 500 psi.

To further maintain the fluid pressure in fluid chamber 44, housing 32 includes an outer cylindrical surface 52 that engages the chamber formed by housing bore 24, as shown in FIG. 2. Outer cylindrical surface 52 may include a sealing ring, such as a combination of O-ring 54A and backup ring 54B, to allow a small clearance between outer cylindrical surface 52 and housing bore 24 while at the same time preventing fluid from leaking past this seal.

Figure 14:
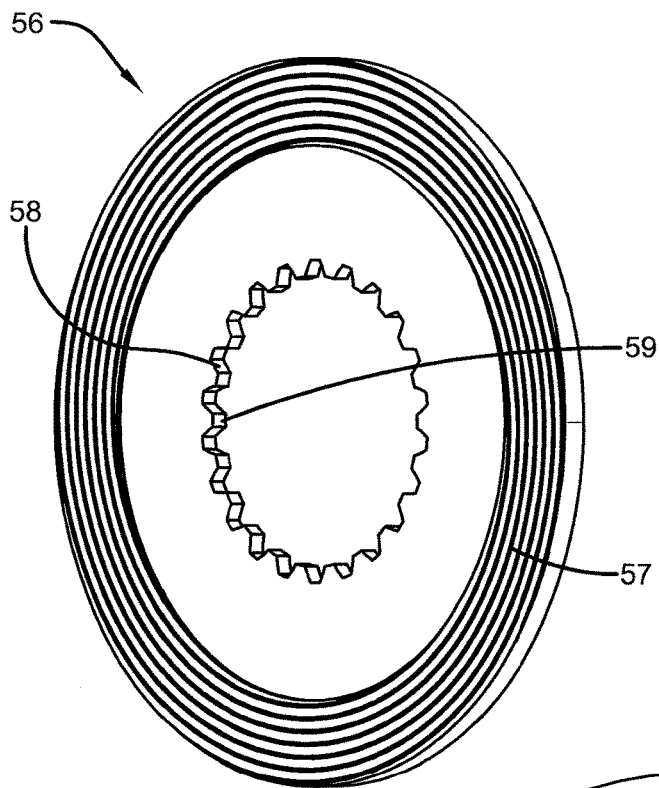
FIG. 14 is a perspective view of a rotating disc of the brake of FIG. 1.
Figure 15:
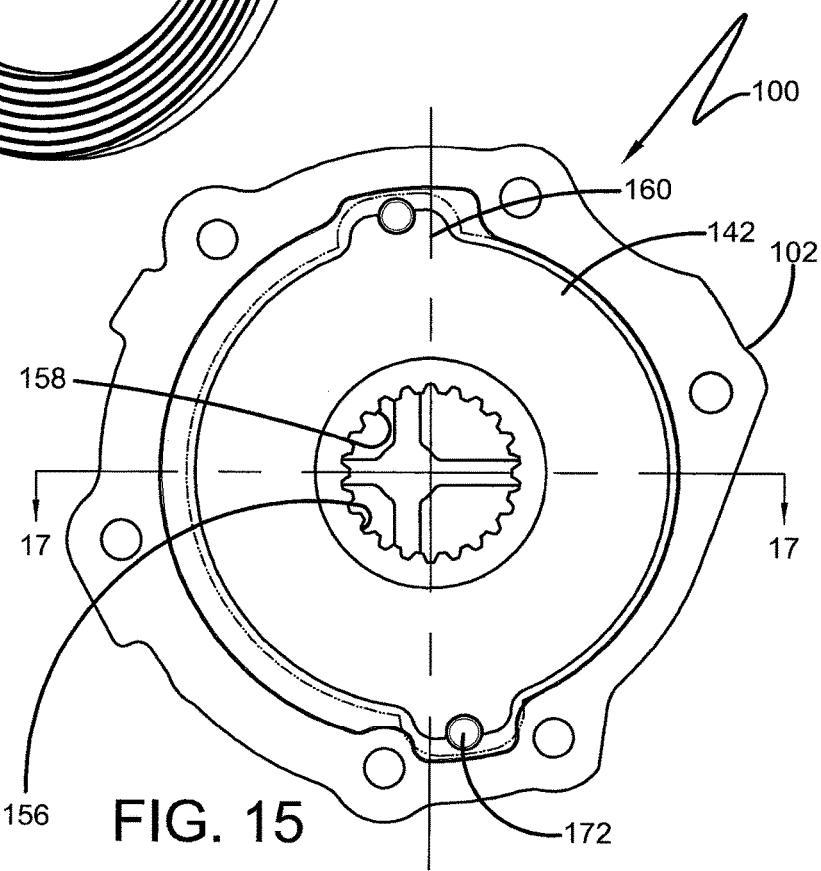
FIG. 15 is a front elevational view of a brake according to a second embodiment of the present invention.

The engaging and releasing of disc stack 22 will now be further described. Disc stack 22 includes a plurality of stationary discs 40 and a plurality of rotating discs 56. Stationary discs 40 and rotating discs 56 are positioned in an alternating manner, such as shown by stationary discs 40A, 40B, 40C and rotating discs 56A, 56B. Rotating discs are attached to a central, rotating shaft (not shown) such as by a spline and groove mechanism. For example, with reference to FIG. 1, the shaft can include ridges that mate with grooves 58 in rotating discs 56, 56A, 56B. Similarly, ridges 60 in rotating discs 56, 56A, 56B mate with grooves in the shaft. In one or more embodiments, this spline and groove mechanism utilizes an involute spline. Other techniques for driving discs 56, 56A, 56B utilizing a shaft may also be known to those skilled in the art. As shown in FIG. 14, rotating discs 56, 56A, 56B may include one or more ridges 57, which may be provided for design purposes or as a result of the manufacturing process.

Figure 13:
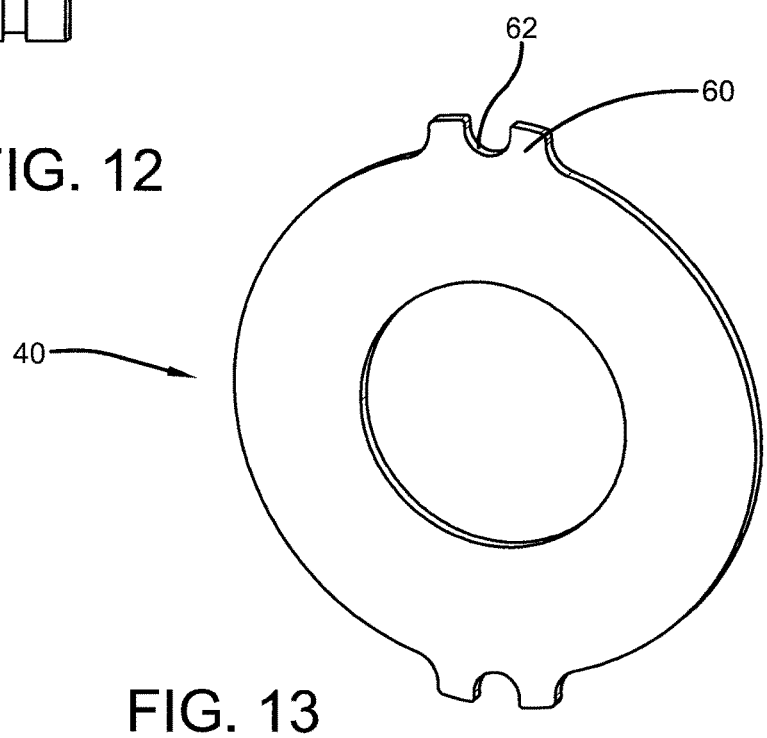
FIG. 13 is a perspective view of a stationary disc of the brake of FIG. 1.

While rotating discs 56, 56A, 56B are able to rotate with the shaft, stationary discs 40, 40A, 40B, 40C do not rotate and do not move with respect to brake 10. Each stationary disc 40, 40A, 40B, 40C includes at least one set of tabs 60 extending therefrom. For example, as shown in FIG. 13, stationary discs 40, 40A, 40B, 40C include a first set of two tabs 60 extending from a first end and a second set of two tabs 60 extending from a second end. A torque pin groove 62 is formed between each set of tabs 60. Each tab 60 is generally rectangular in shape, with a curved shape on the inside, i.e., the side facing the other tab 60 in the set, as to form a generally semi-circular shaped torque pin groove 62. Tabs 60 can also have a curved shape on the outside.

Figure 6:
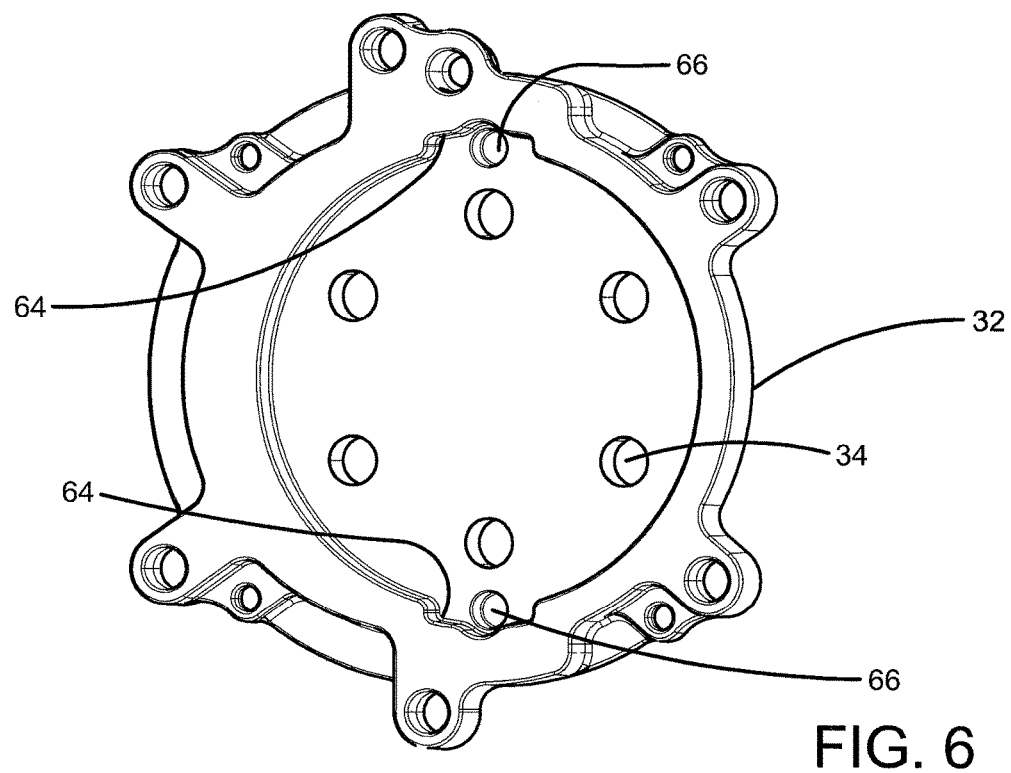
FIG. 6 is a front perspective view of a brake housing of the brake of FIG. 1.
Figure 7:
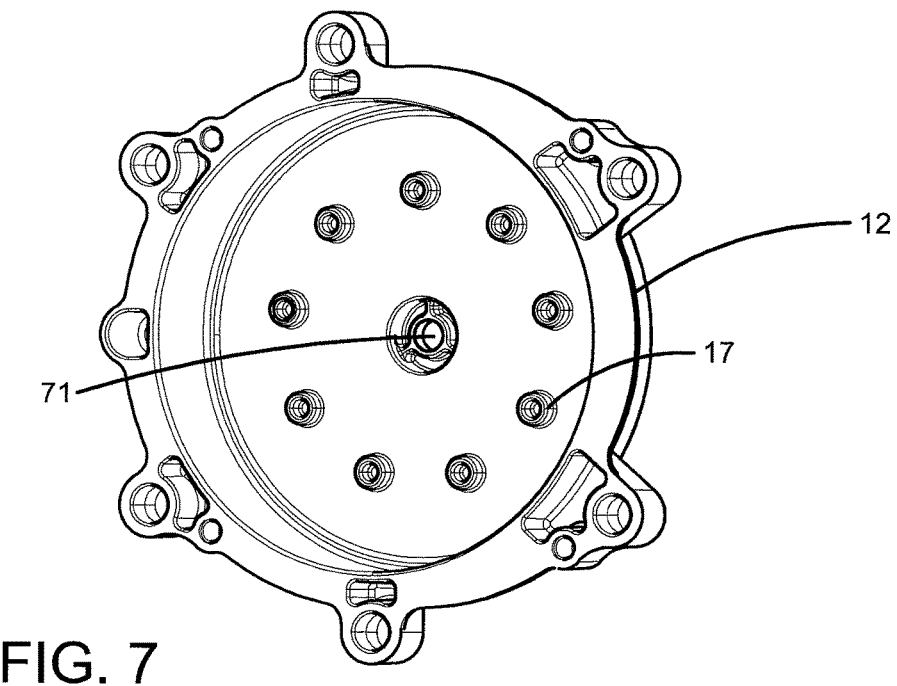
FIG. 7 is a front perspective view of a power plate of the brake of FIG. 1.
Figure 8:
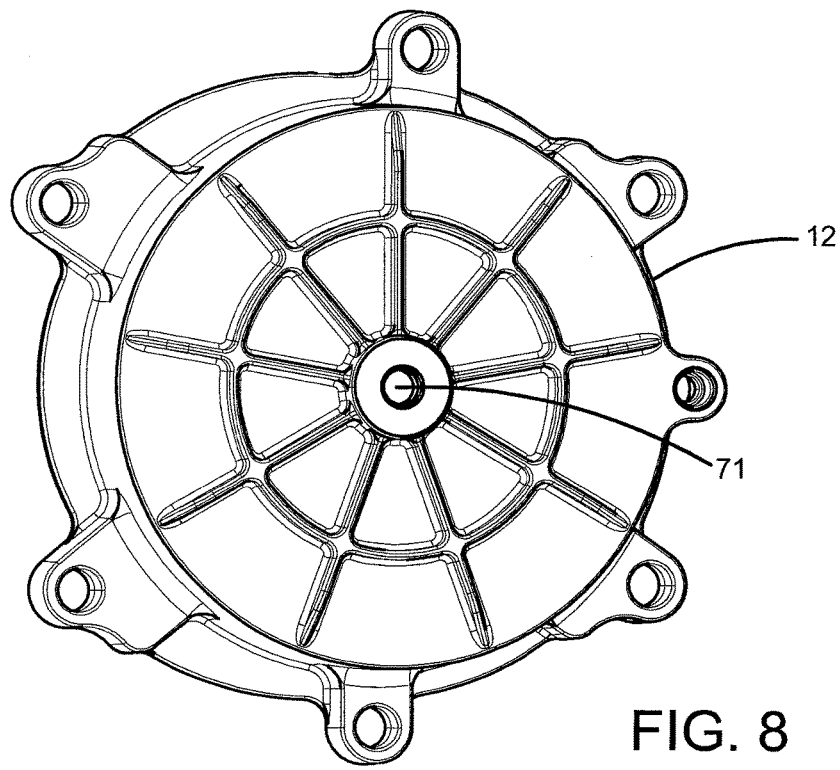
FIG. 8 is a rear perspective view of a power plate of the brake of FIG. 1.

Tabs 60 are capable of fitting into a relief 64 formed on the inside of housing 32, as shown in FIG. 6. Relief 64 should be shaped similar to a set of tabs 60 as to receive and secure tabs 60 therein. In one or more embodiments, relief 64 may be shaped as a semi-circular cutaway in housing 32. In other embodiments, relief 64 can have a shape other than a semi-circle, such as rectangular, semi-oval, and other such shapes generally known to those skilled in the art. As shown in FIG. 6, one or more embodiments of the present invention include a first relief 64 positioned opposite, or approximate thereto, from a second relief 64. This may also be described as first relief 64 being positioned 180 degrees, or approximate thereto, from second relief 64. First relief 64 and second relief 64 may be positioned in other positions relative to each other based on suitable designs. In one or more embodiments, stationary discs 40, 40A, 40B, 40C include a first set of tabs 60 in the first relief 64 and a second set of tabs 60 in the second relief 64.

Two torque pin holes 66 (FIG. 6) are adapted to each receive a torque pin 68 (FIG. 1). Thus, when tabs 60 are in reliefs 64 and torque pins 68 are in torque pin holes 66, stationary discs 40A, 40B, 40C are held stationary with respect to brake 10.

For assembling disc stack 22, the alternating arrangement of discs is put in place. That is, stationary disc 40A is first inserted, then rotating disc 56A, then stationary disc 40B, then rotating disc 56B, and so on. Torque pins 68 are inserted into torque pin holes 66. To secure torque pins 68 in place, a second torque pin hole (not shown) exists in the mounting location, such as on the transmission. Thus, each pair of torque pin hole 66 and second torque pin hole supports a torque pin 68 to secure stationary discs 40A, 40B, 40C in position with respect to brake 10.

Again, in the "default" position of piston 14, springs 16 cause cylindrical posts 30 to engage disc stack 22. This clamps together disc stack 22 as to clamp rotating discs 56A, 56B between stationary discs 40A, 40B, 40C, preventing rotating discs 56A, 56B from rotating. The friction in disc stack 22 is what then resists the torque on the wheel of a vehicle. In one or more embodiments, rotating discs 56A, 56B are lined with a friction material on both sides and stationary discs 40A, 40B, 40C have no friction material. In other embodiments, stationary discs 40A, 40B, 40C are lined on both sides with friction material and rotating discs 56A, 56B are unlined. In other embodiments, stationary discs 40A, 40B, 40C and rotating discs 56A, 56B are each lined on only one side. In these embodiments, the friction material side of one disc would interface with the unlined side of the next disc.

As previously discussed, this braking position is maintained until the pressure of the hydraulic fluid behind piston 14 is sufficient to overcome the spring force of springs 16. This then moves piston 14 away from disc stack 22 thereby allowing rotating discs 56A, 56B to rotate freely with a central shaft. Brake 10 is now disengaged and the associated vehicle is able to move. Brake 10 is disengaged until the hydraulic pressure is allowed to drop as to cause piston 14 to re-engage disc stack 22. If the associated vehicle is turned off or has a hydraulic system failure, hydraulic pressure behind piston 14 returns to zero and the brake 10 is engaged.

Brake 10 includes a manual release feature that can be used to override the regular hydraulic action of brake 10 in case the vehicle hydraulic system becomes disabled or is unable to be used. Using the below described manual release feature, the associated vehicle could be towed or brake 10 could be serviced without the need for the vehicle to be running.

FIG. 2 shows brake 10 in the manual release position with a threaded article 70, which may also be described as a smaller size bolt 70, positioned through a hole 71 in the center of power plate 12 and into a threaded bore 72 in piston 14. The threaded end of the smaller size bolt 70 is adapted to fit with the threads of threaded bore 72. The hydraulic fluid pressure will be at zero before positioning smaller size bolt 70 in hole 71 and threaded bore 72. Upon placing smaller size bolt 70 in hole 71 and threaded bore 72, rotational movement of piston 14 is prevented due to cylindrical posts 30 being positioned in holes 34 in fixedly positioned housing 32. When the threads of the smaller size bolt 70 are inserted into the threads of threaded bore 72, piston 14 is pulled toward power plate 12. This allows piston 14 to overcome the spring force of springs 16 to thereby release disc stack 22, without the use of hydraulic pressure. Smaller size bolt 70 may be utilized with a washer 74 positioned under the head of smaller size bolt 70.

When in the manual release position, a sealing plug 76 may be positioned in a storage location 78. Sealing plug 76 may be utilized with a sealing ring 80 positioned under the head of sealing plug 76.

To go from the manual release position to the operational configuration of brake 10, smaller size bolt 70 is removed from hole 71 and threaded bore 72 and sealing plug 76 is removed from storage location 78, and their positions are swapped. That is, sealing plug 76 is positioned in hole 71 and smaller size bolt is positioned in storage location 78. Sealing plug 76 and sealing ring 80 are adapted to seal brake 10 from leakage, such as by plug 76 having threads that mate with threads in hole 71. Sealing ring 80 provides additional sealing capability.

To place brake 10 back in the manual release position, the above described steps can be repeated. That is, hydraulic fluid pressure is at zero or goes to zero and sealing plug 76 is removed from hole 71 and smaller size bolt 70 is removed from storage location 78, and their positions are swapped.

Brake 10 can be sized as to fit a number of applications and vehicle sizes. Brake 10 can also be characterized by the available hydraulic force and the predetermined spring force of springs 16. In one or more embodiments, the hydraulic force available behind piston 14 is in the range of from 0 psi to 500 psi. In one or more embodiments, the predetermined spring clamp force of springs 16 is in the range of from 2200 lbf to 3200 lbf. The hydraulic force and spring clamp force can each be adjusted to account for vehicle size, speed, and environment.

Brake 10 may be used on a construction backhoe, but could be used in any suitable vehicle. Brake 10 is particularly envisioned as being mounted to the transmission of such a vehicle, though other suitable mounting locations are possible.

Figure 16:
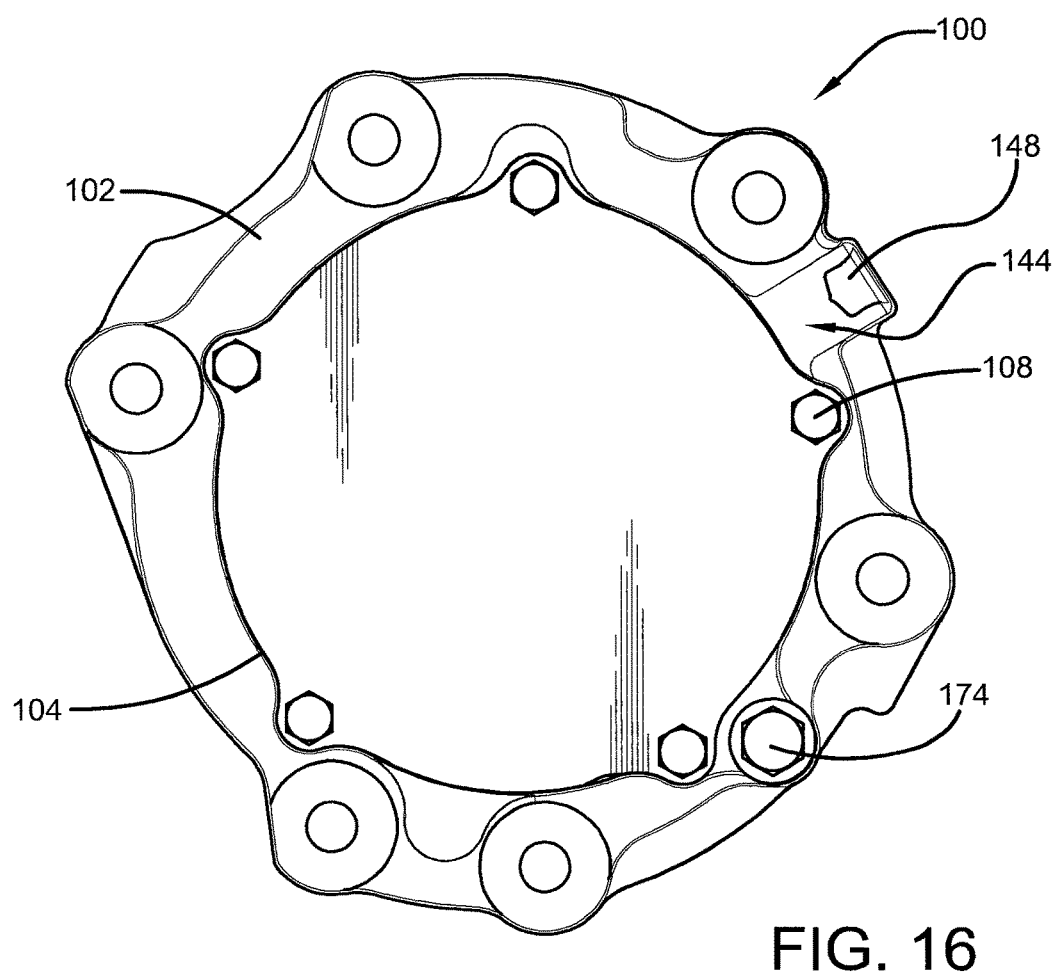
FIG. 16 is a rear elevational view of the brake of FIG. 15.
Figure 24:
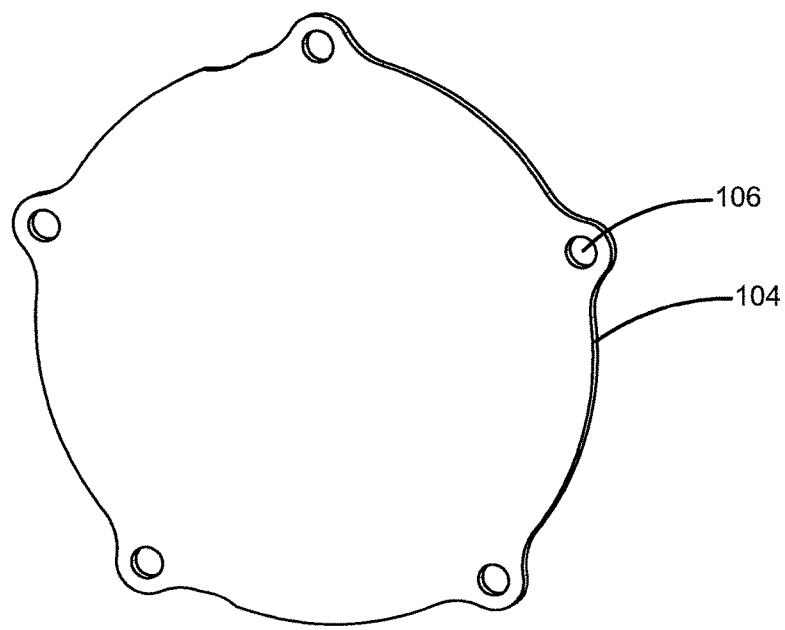
FIG. 24 is a perspective view of a cover plate of the brake of FIG. 15.

A brake according to another embodiment of the present invention is generally indicated by the numeral 100, as shown in FIG. 16. Brake 100 includes a housing 102, which carries and protects components of brake 100 and locates it in operative relation to a conventional vehicle transmission (not shown), preferably to the transmission of a construction backhoe. A cover plate 104 includes a plurality of holes 106 (FIG. 24) for affixing cover plate 104 to the rear end of housing 102 through the use of one or more fasteners 108. Cover plate 104 seals the brake from contaminants, while also providing access to the manual release feature, as will be hereinafter discussed. A gasket 110 may be positioned between housing 102 and cover plate 104.

Housing 102 mounts brake 100 to a conventional vehicle transmission by way of one or more fasteners (not shown). Multiple mounting adapters (not shown) for mounting brake 100 to various machines and transmissions are, or will become, known to one skilled in the art.

Housing 102 houses a spring applied, hydraulically released (SAHR) assembly, which includes a piston 112 and a plurality of springs 114 capable of acting on piston 112. Piston 112 includes a body portion 116 including one or more spring housings 118 to receive springs 114 therein. Spring housing 118 can also be described as a cutout 118 formed in piston 112. In one or more embodiments, spring housing 118 is formed as a single cylindrical cutout from piston 112. A first end of each spring 114 engages, a spring retainer 115, which is proximate piston 112, and a second end of each spring 114 engages a spring plate 120. Spring retainer 115 stabilizes and centers springs 114 to act on piston 112 and includes a spring retainer protrusion 117 for each spring 114. As will be described further herein, in a "default" position, springs 114 cause piston 112 to engage a disc stack, generally indicated by the numeral 122, to thereby enact a braking function.

Piston 112 is specifically housed in a bore 124 of housing 102. Piston body portion 116 includes an outer cylindrical surface 126 that engages the larger chamber formed by housing bore 124. Outer cylindrical surface 126 may include a sealing ring, such as O-ring 128, to allow a small clearance between outer cylindrical surface 126 and bore 124 while still preventing fluid from leaking past this seal.

Figure 18:
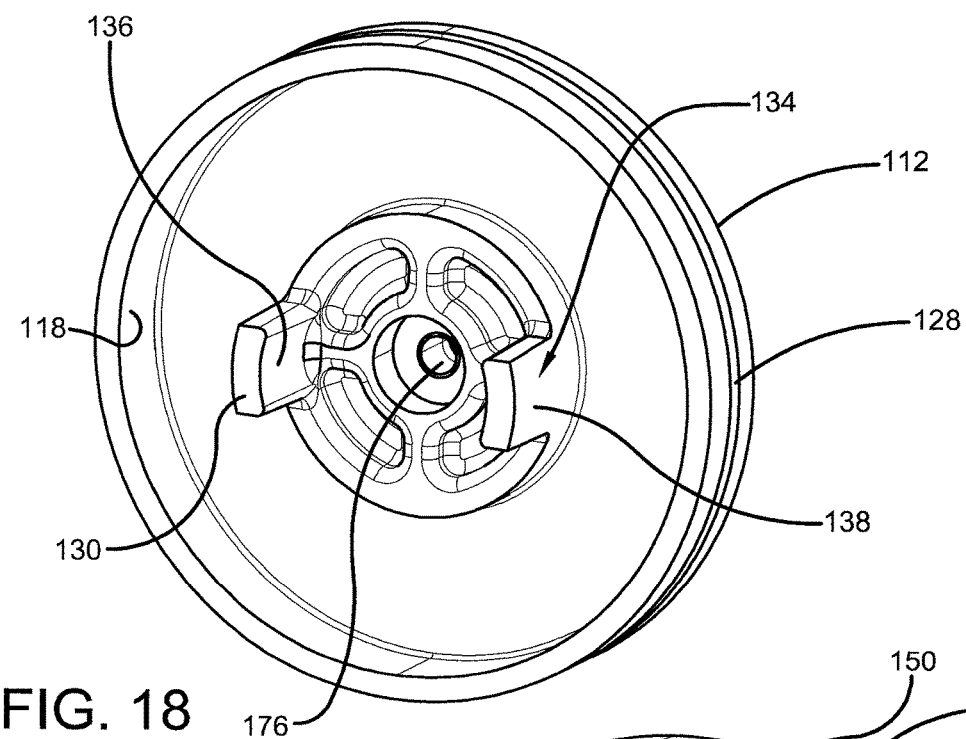
FIG. 18 is a rear perspective view of a piston of the brake of FIG. 15.
Figure 19:
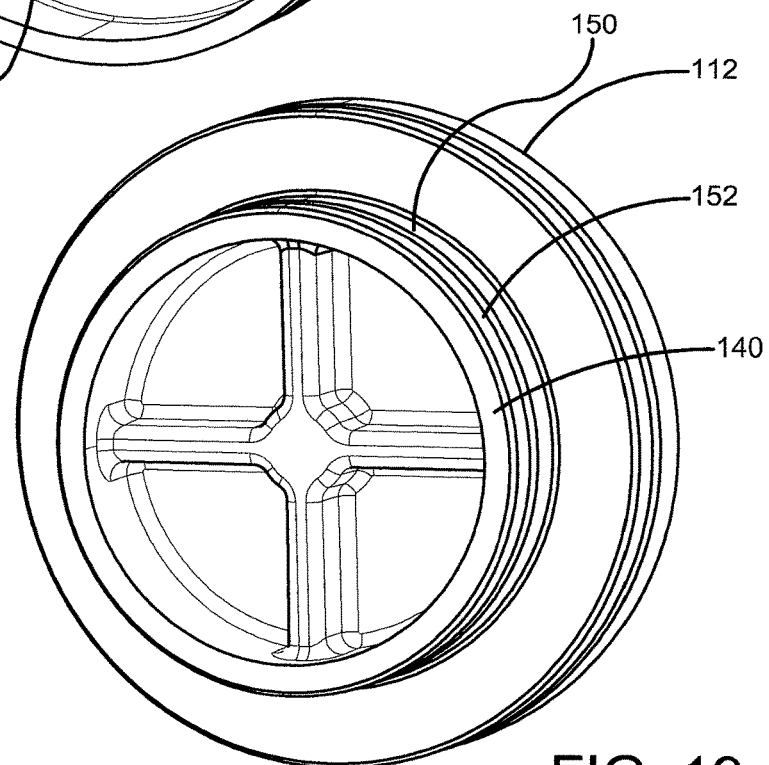
FIG. 19 is a front perspective view of a piston of the brake of FIG. 15.

Piston 112 includes one or more posts 130 extending from body portion 116. Posts 130 extend toward and proximate cover plate 104 through holes 132 in spring plate 120, which may be secured in place by a retaining ring 133. As seen in FIG. 18, one or more embodiments utilize two posts 130 positioned substantially opposite each other. Although two posts 130 are shown in FIG. 18, any suitable arrangement and any suitable number of posts 130 may be utilized. The use of posts 130 instead of an annulus allows for multiple suitable configurations for the posts 130 based on a desired design for brake 100. Each post 130 includes an outer surface 134 that engages holes 132 in spring plate 120.

Posts 130 may include an inner curve 136 and an outer curve 138 for matching the shape of holes 132. This may be described as the inner diameter of holes 132 closely mimicking the outer diameter of posts 130. This may also be described as the cross sectional shape of posts 130 closely mimicking the shape of holes 132. The shape of posts 130 will be designed such that posts 130 fit into holes 132, which will be hereinafter discussed with respect to the manual release feature.

Figure 17:
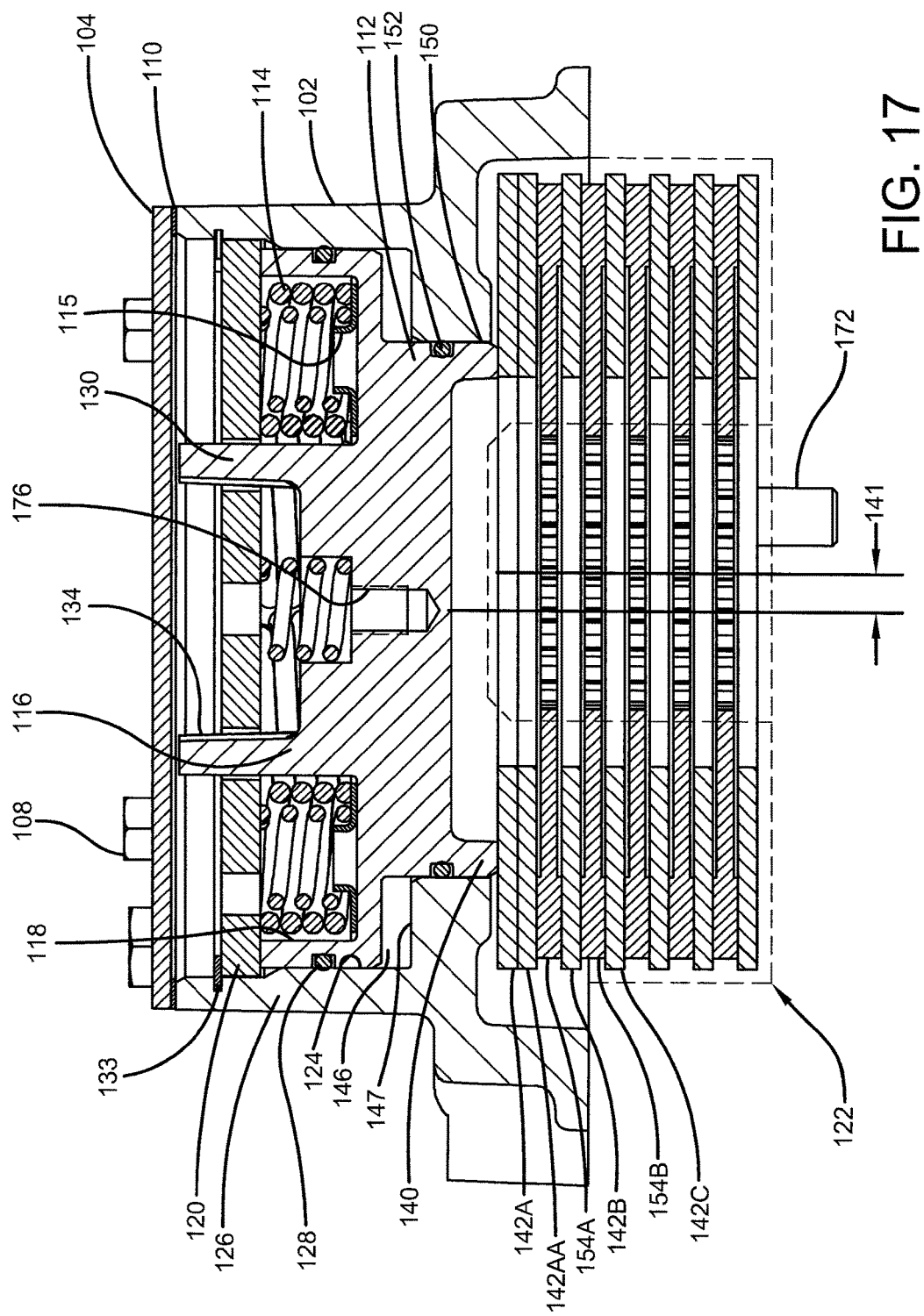
FIG. 17 is a sectional view taken substantially along line 17-17 of FIG. 15.

As previously described, the "default" position of piston 112 allows springs 114 to cause piston 112 to engage disc stack 122 to thereby enact a braking function. Specifically, an annular cylindrical extension 140 extends from body portion 116 on an end opposite posts 130 to contact disc stack 122. As seen in FIG. 17, in one or more embodiments the axial center of piston 112 is latitudinally spaced from the axial center of disc stack 122 as at spacing 141, which may also be described as offset 141. Latitudinal spacing 141 can be advantageous based on certain designs for brake 100 with respect to the vehicle transmission where brake 100 is to be mounted. In one or more embodiments, latitudinal spacing 141 is a distance of 0.25" or approximate thereto. In one or more embodiments, latitudinal spacing 141 may be a distance of from about 0.25" to about 1.50".

With respect to the engagement of disc stack 122, annular cylindrical extension 140 particularly engages a proximate, or inboard, stationary disc 142A of disc stack 122, thereby causing inboard stationary disc 142A to engage the next disc, and so on, to thereby engage disc stack 122. Thus, the spring force of springs 114 must be selectively overcome in order to move piston 112 to an unactuated position to disengage disc stack 122.

To accomplish this, a hydraulic fluid supply network, generally indicated by the numeral 144 in FIG. 16, provides pressurized fluid to a fluid chamber 146 by way of a fluid port 148 in fluid communication with fluid chamber 146. Generally, fluid chamber 146 includes the fluid portion of brake 100 between piston 112 and an inner wall 147 of housing 102. By way of fluid chamber 146, piston 112 can be said to be in fluid communication with a source of hydraulic fluid. Upon adding hydraulic fluid to fluid chamber 146, the hydraulic fluid fluidly engages piston 112 as to apply force against springs 114.

Once the pressure of the hydraulic fluid behind piston 112 is sufficient to overcome the spring force of springs 114, piston 112 travels against springs 114, thereby releasing disc stack 122. The disengaged position will create a spacing between annular cylindrical extension 140 and inboard stationary disc 142A.

Advantageously, the structure of piston 112 allows the effective piston diameter of piston 112 to be larger than a piston without extension 140 and offset 141. This larger effective piston diameter allows for a generally lower hydraulic system pressure to generate enough force to overcome the spring force of springs 114 in order to disengage disc stack 122. In one or more embodiments, brake 100 is utilized with a hydraulic system having an available pressure of 440 psi or approximate thereto. In one or more embodiments, brake 100 is utilized with a hydraulic system having a maximum available pressure of 440 psi. In one or more embodiments, brake 100 may be utilized with a hydraulic system having a maximum available pressure of 500 psi.

To further maintain the fluid pressure in fluid chamber 146, annular cylindrical extension 140 includes an outer surface 150 that engages the smaller chamber formed by housing bore 124. Outer surface 150 may include a sealing ring, such as O-ring 152, to allow a small clearance between outer surface 150 and housing bore 124 while at the same time preventing fluid from leaking past this seal.

The engaging and releasing of disc stack 122 will now be further described. Disc stack 122 includes a plurality of stationary discs 142 and a plurality of rotating discs 154. Inboard stationary disc 142A is proximate a second stationary disc 142AA and then stationary discs 142 and rotating discs 154 are positioned in an alternating manner, such as shown by stationary discs 142AA, 142B, 142C and rotating discs 154A, 154B. The repeating stationary discs 142A, 142AA may serve to provide additional spacing and rigidity to disc stack 122.

Figure 21:
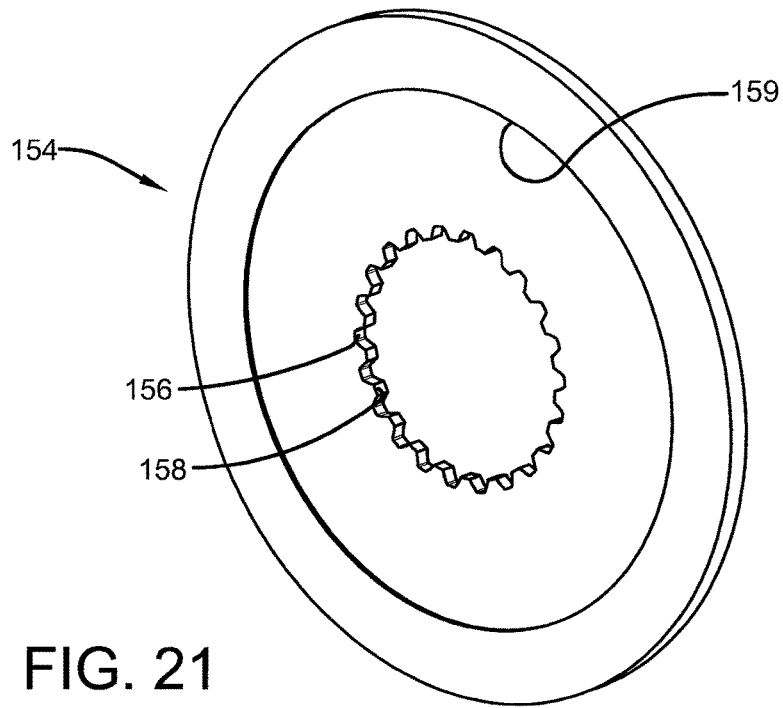
FIG. 21 is a perspective view of a rotating disc of the brake of FIG. 15.
Figure 22:
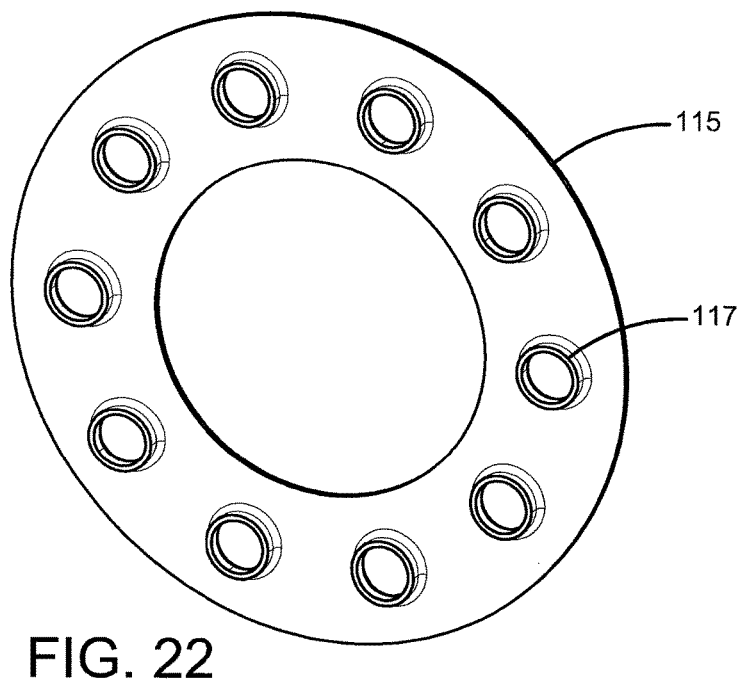
FIG. 22 is a perspective view of a spring retainer of the brake of FIG. 15.
Figure 23:
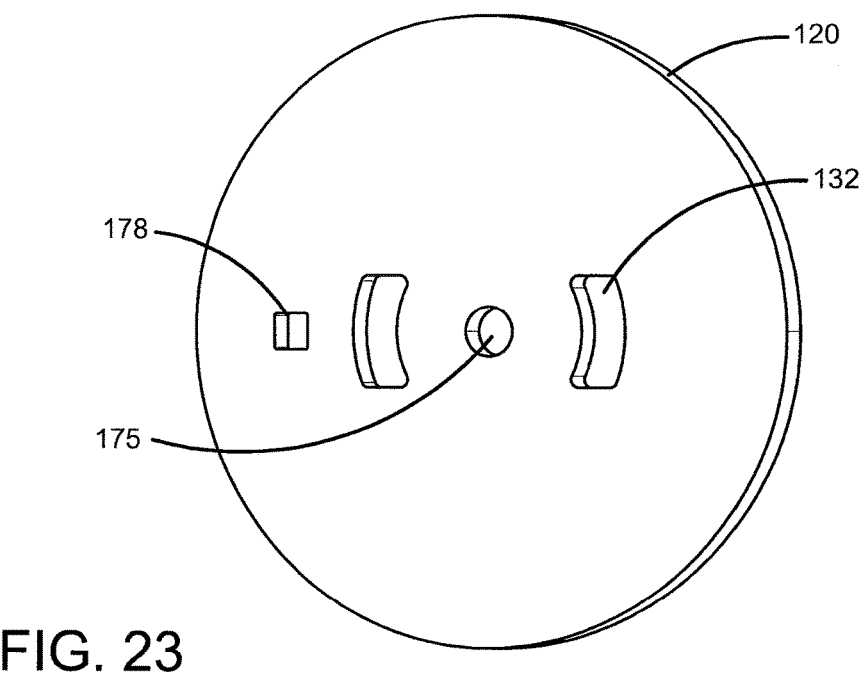
FIG. 23 is a perspective view of a spring plate of the brake of FIG. 15.

Rotating discs are attached to a central, rotating shaft (not shown) such as by a spline and groove mechanism. For example, with reference to FIG. 21, the shaft can include ridges that mate with grooves 156 in rotating discs 154, 154A, 154B. Similarly, ridges 158 in rotating discs 154, 154A, 154B mate with grooves in the shaft. In one or more embodiments, this spline and groove mechanism utilizes an involute spline. Other techniques for driving discs 154, 154A, 154B utilizing a shaft may also be known to those skilled in the art. Rotating discs 154, 154A, 154B may include a wider diameter ridge 159 or a groove pattern (not shown) for improving brake function.

Figure 20:
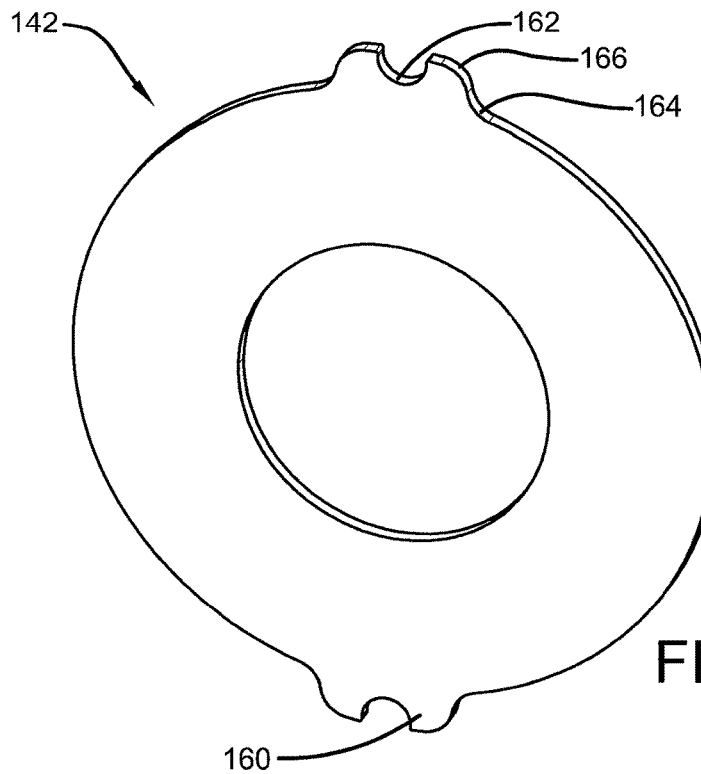
FIG. 20 is a perspective view of a stationary disc of the brake of FIG. 15.

While rotating discs 154A, 154B are able to rotate with the shaft, stationary discs 142A, 142AA, 142B, 142C do not rotate and do not move with respect to brake 100. Each stationary disc 142, 142A, 142AA, 142B, 142C includes at least one set of tabs 160 extending therefrom. For example, stationary discs 142, 142A, 142AA, 142B, 142C include a first set of two tabs 160 (FIG. 20) extending from a first end and a second set of two tabs 160 extending from a second end. A torque pin groove 162 is formed between each set of tabs 160. Each tab 160 includes a curved shape on the inside, i.e. the side facing the other tab 160 in the set, as to form a generally semi-circular shaped torque pin groove 162. Tabs 160 can also have a curved shape on the outside where a concave portion 164 extends into a convex portion 166.

Figure 26:
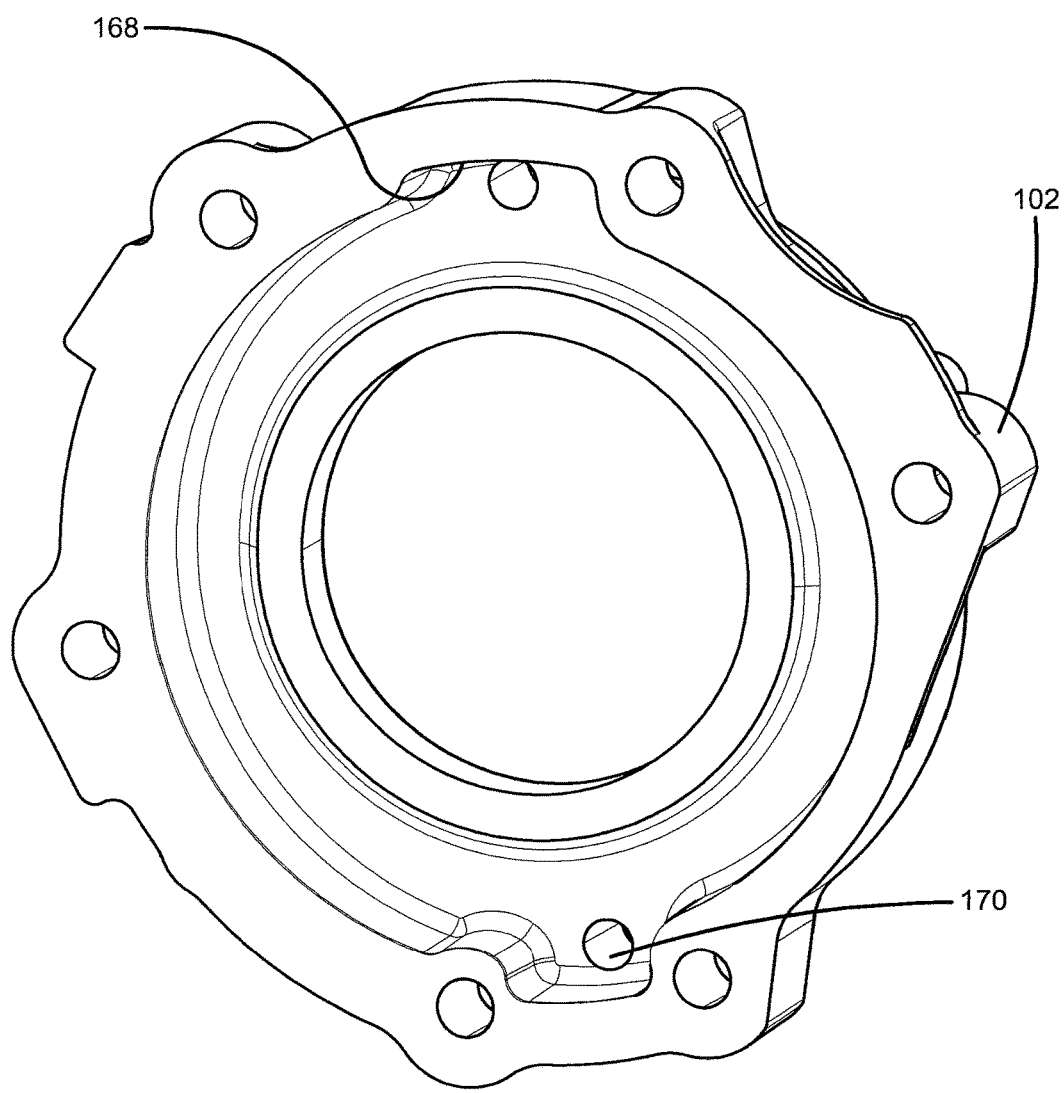
FIG. 26 is a front perspective view of a housing of the brake of FIG. 15.

Tabs 160 are capable of fitting into a relief 168 formed in the inside of housing 102 as shown in FIG. 26. Relief 168 should be shaped similar to a set of tabs 160 as to receive and secure tabs 160 therein. In one or more embodiments, relief 168 can be shaped as a semi-circle, rectangle, semi-oval, and other such shapes generally known to those skilled in the art. As shown in FIG. 26, one or more embodiments of the present invention include a first relief 168 positioned opposite, or approximate thereto, from a second relief 168. This may also be described as first relief 168 being positioned 180 degrees, or approximate thereto, from second relief 168. First relief 168 and second relief 168 may be positioned in other positions relative to each other based on suitable designs. In one or more embodiments, stationary discs 142A, 142AA, 142B, 142C include a first set of tabs 160 in the first relief 168 and a second set of tabs 160 in the second relief 168.

Two torque pin holes 170 (FIG. 26) are adapted to each receive a torque pin 172. Thus, when tabs 160 are in reliefs 168 and torque pins 172 are in torque pin holes 170, stationary discs 142A, 142AA, 142B, 142C are stationary with respect to brake 100.

For assembling disc stack 122, the arrangement of discs is put in place. That is, stationary disc 142A is first inserted, then stationary disc 142AA, then rotating disc 154A, then stationary disc 142B, then rotating disc 154B, and so on. Torque pins 172 are inserted into torque pin holes 170. To secure torque pins 172 in place, a second torque pin hole (not shown) exists in the transmission housing. Thus, each pair of torque pin hole 170 and second torque pin hole supports a torque pin 172 to secure stationary discs 142A, 142AA, 142B, 142C in position with respect to brake 100.

Again, in the "default" position of piston 112, springs 114 cause annular cylindrical extension 140 to engage disc stack 122. This clamps together disc stack 122 as to clamp rotating discs 154A, 154B between stationary discs 142AA, 142B, 142C, preventing rotating discs 154A, 154B from rotating. The friction in disc stack 122 is what then resists the torque on the wheel of a vehicle. In one or more embodiments, rotating discs 154A, 154B are lined with a friction material on both sides and stationary discs 142AA, 142B, 142C have no friction material. In one or more embodiments, stationary discs 142AA, 142B, 142C are lined on both sides with friction material and rotating discs 154A, 154B are unlined. In one or more embodiments, stationary discs 142AA, 142B, 142C and rotating discs 154A, 154B are each lined on only one side. In these embodiments, the friction material side of one disc may interface with the unlined side of the next disc.

As previously discussed, this braking position is maintained until the pressure of the hydraulic fluid behind piston 112 is sufficient to overcome the spring force of springs 114. This then moves piston 112 away from disc stack 122 thereby allowing rotating discs 154A, 154B to rotate freely with a central shaft. Brake 100 is now disengaged and the associated vehicle is able to move. Brake 100 is disengaged until the hydraulic pressure is allowed to drop as to cause piston to re-engage disc stack 122. If the associated vehicle is turned off or has a hydraulic system failure, hydraulic pressure behind piston 112 returns to zero.

Brake 100 includes a manual release feature that can be used to override the regular hydraulic action of brake 100 in case the vehicle hydraulic system becomes disabled or is unable to be used. Using the below described manual release feature, the associated vehicle could be towed or brake 100 could be serviced without the need for the vehicle to be running.

Figure 25:
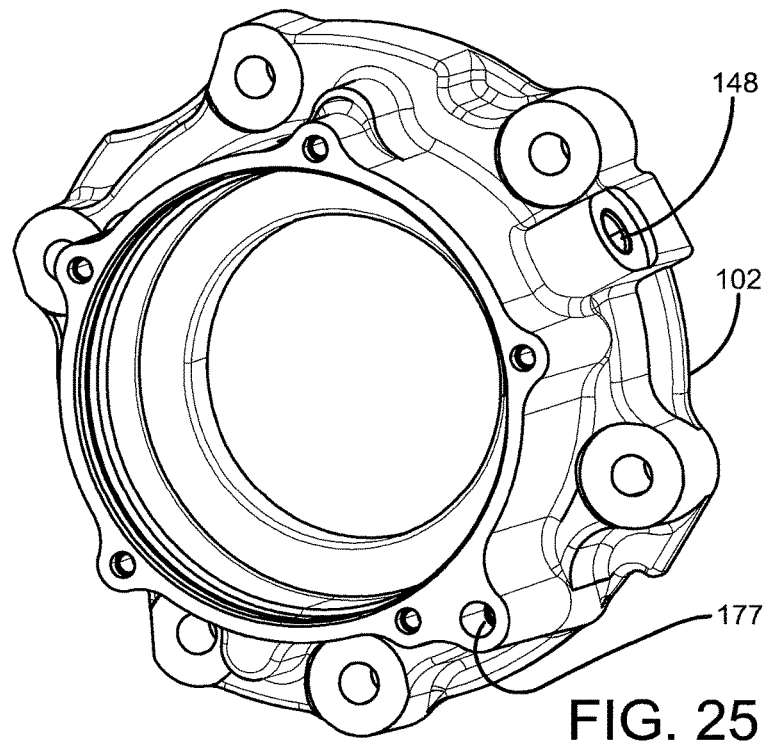
FIG. 25 is a rear perspective view of a housing of the brake of FIG. 15.

To manually release disc stack 122, with the hydraulic fluid pressure at zero, cover plate 104 is removed from brake 100 to provide access to spring plate 120 and a threaded bore 176 in piston 112. Then, a threaded article 174, which can also be referred to as a threaded bolt 174, having a threaded end will be inserted into hole 175 in spring plate 120 and into threaded bore 176 in piston 112. FIG. 16 shows threaded bolt 174 in a storage location 177 (FIG. 25), where threaded article 174 may be kept until needed for insertion into threaded bore 176 to enact a manual release. Rotational movement of piston 112 must be prevented before enacting manual release. Posts 130 are already positioned in holes 132 in spring plate 120, and spring plate 120 is temporarily fixedly positioned by inserting an article (not shown) into square hole 178, which may also be described as an anti-rotation feature 178. After an article, such as the square end of a ⅜" socket drive, is inserted into square hole 178 in spring plate 120, threaded article 174 is inserted into hole 175 and threaded bore 176. The threaded end of threaded article 174 should be adapted to fit with the threads of threaded bore 176. When the threads of threaded article 174 are inserted into the threads of threaded bore 176, piston 112 is pulled away from disc stack 122 and eventually overcomes the spring force of springs 114. This releases disc stack 122, without the use of hydraulic pressure. To place brake 100 back into normal operation, threaded article 174 is removed from threaded bore 176 and is reinstalled in storage location 177.

Brake 100 can be sized as to fit a number of applications and vehicle sizes. Brake 100 can also be characterized by the available hydraulic force and the predetermined spring force of springs 114. In one or more embodiments, the hydraulic force available behind piston 112 is in the range of from 0 psi to 500 psi. In one or more embodiments, the predetermined spring clamp force of springs 114 is in the range of from 2200 lbf to 3200 lbf. The hydraulic force and spring clamp force can each be adjusted to account for vehicle size, speed, and environment.

Brake 100 may be used on a construction backhoe, but could be used in any suitable vehicle. Brake 100 is particularly envisioned as being mounted to the transmission of such a vehicle, though other suitable mounting locations are possible.

It is thus evident that a brake constructed as described herein accomplishes the objects of the present invention and otherwise substantially improves the art.

What is claimed is:

1. A brake comprising a piston having an axial center, a disc stack having an axial center offset from said axial center of said piston, and one or more springs adapted to urge said piston into contact with said disc stack to establish a default position of the brake, said piston including an annular cylindrical extension at a first end of said piston, posts extending from a body portion of said piston at a second end of said piston, said body portion being positioned between said annular cylindrical extension and a spring plate, said spring plate having holes therein for receiving said posts, said piston further including a threaded bore therein for receiving a threaded article, and said disc stack having an alternating arrangement of stationary discs and rotating discs, where the alternating arrangement of stationary discs and rotating discs includes an inboard stationary disc, said annular cylindrical extension being urged into contact with said inboard stationary disc in the default position of the brake, the brake further comprising a fluid chamber in fluid communication with said piston, said fluid chamber being capable of being pressurized with hydraulic fluid, thereby causing said annular cylindrical extension to disengage said inboard stationary disc, and thereby allowing said rotating discs to rotate with a corresponding central shaft.

2. The brake of claim 1, said annular cylindrical extension having an axial center, wherein said axial center of said annular cylindrical extension is axially aligned with said axial center of said piston and axially offset from said axial center of said disc stack.

3. The brake of claim 1, further comprising a brake housing with an open end, said brake housing receiving said piston therein, and a cover plate closing said open end.

4. A brake comprising a piston having an axial center, a disc stack having an axial center offset from said axial center of said piston, and one or more springs adapted to urge said piston into contact with said disc stack to establish a default position of the brake, said piston including an extension formed as an annular cylindrical extension, said annular cylindrical extension having an axial center, wherein said axial center of said annular cylindrical extension is axially aligned with said axial center of said piston and axially offset from said axial center of said disc stack, said piston including a body portion having posts extending therefrom at an end of said body portion opposite said annular cylindrical extension, said body portion being positioned between said annular cylindrical extension and a spring plate, said spring plate having holes therein for receiving said posts, said piston having a threaded bore therein for receiving a threaded article, a brake housing with an open end, said brake housing receiving said piston therein, and a cover plate closing said open end.

5. A method of operating the brake of claim 4, comprising the steps of removing the cover plate, inserting the threaded article into the threaded bore, thereby urging the piston against the springs to thereby urge the annular cylindrical extension of the piston to disengage contact with the disc stack.

6. A brake comprising a piston having a threaded bore therein, a disc stack, and a plurality of springs each positioned in a respective spring housing of said piston, each of said spring housings being positioned in said piston at an end of said piston opposite said disc stack, said plurality of springs adapted to urge said piston into contact with said disc stack when said threaded bore is devoid of a threaded article to establish a default position of the brake, said threaded bore adapted to receive said threaded article such that when said threaded article is positioned in said threaded bore, said piston is urged out of contact with said disc stack, and said piston having an axial center, and said disc stack having an axial center offset from said axial center of said piston.

7. The brake of claim 6, said piston including an extension formed as an annular cylindrical extension, said extension having an axial center, wherein said axial center of said annular cylindrical extension is axially aligned with said axial center of said piston and axially offset from said axial center of said disc stack.

8. The brake of claim 6, further including a housing having a storage location adapted to receive said threaded article when said threaded article is not positioned in said threaded bore.

* * * * *